(12) United States Patent
Kano et al.

(10) Patent No.: US 11,095,133 B2
(45) Date of Patent: Aug. 17, 2021

(54) SIMPLE BATTERY AND CHARGER SYSTEM

(71) Applicant: RENESAS ELECTRONICS AMERICA INC., Milpitas, CA (US)

(72) Inventors: Kota Kano, San Jose, CA (US); Tetsuo Sato, San Jose, CA (US); Shigeru Maeta, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 16/889,407

(22) Filed: Jun. 1, 2020

(65) Prior Publication Data

US 2020/0295583 A1 Sep. 17, 2020

Related U.S. Application Data

(62) Division of application No. 15/657,134, filed on Jul. 22, 2017, now Pat. No. 10,673,254.

(60) Provisional application No. 62/365,640, filed on Jul. 22, 2016.

(51) Int. Cl.
*H02J 7/00* (2006.01)

(52) U.S. Cl.
CPC .......... *H02J 7/0021* (2013.01); *H02J 7/0013* (2013.01); *H02J 7/0045* (2013.01); *H02J 7/0047* (2013.01); *H02J 7/007184* (2020.01); *H02J 7/00034* (2020.01)

(58) Field of Classification Search
USPC ....................................................... 320/112
See application file for complete search history.

(56) References Cited

U.S. PATENT DOCUMENTS

| | | |
|---|---|---|
| 2010/0085022 A1 | 4/2010 | Shimizu et al. |
| 2013/0099747 A1 | 4/2013 | Baba et al. |
| 2015/0153416 A1 | 6/2015 | Umemura et al. |
| 2015/0280464 A1 | 10/2015 | Kang et al. |

*Primary Examiner* — Alexis B Pacheco
(74) *Attorney, Agent, or Firm* — Foley & Lardner LLP

(57) ABSTRACT

A simple battery and battery charger. In one embodiment, the battery charger includes an output terminal that provides a charging voltage Vout and charging current Iout. The battery is contained in a battery pack having an input terminal, which can be connected to the output terminal in order to receive Vout and Iout. The battery charger may include a first circuit for controlling the magnitude of Vout. The battery pack may include a second circuit that generates a control signal when the output terminal is connected to the input terminal. The first circuit is configured to control the magnitude of Vout based on the control signal.

12 Claims, 4 Drawing Sheets

SIMPLE BATTERY AND CHARGER SYSTEM

CROSS-REFERENCE TO RELATED PATENT APPLICATIONS

This application is a divisional of U.S. patent application Ser. No. 15/657,134, filed Jul. 22, 2017, now U.S. Pat. No. 10,673,254, which application claims priority to U.S. Provisional Patent Application Ser. No. 62/365,640, entitled "Simple Battery and Charger System," filed Jul. 22, 2016, the contents of all such applications being hereby incorporated by reference in their entirety and for all purposes as if completely and fully set forth herein.

BACKGROUND

A rechargeable battery is a type of electrical battery that can be charged, discharged into a load, and recharged many times, while a non-rechargeable battery is supplied fully charged, and discarded once discharged. Rechargeable batteries are used in many devices. Cordless electric tools, for example, run off of rechargeable batteries.

Rechargeable batteries are produced in many different configurations. A typical rechargeable battery includes a set of battery cells. The cells may be connected in series, parallel or a mixture of both to deliver the desired voltage, capacity, or power density. The cells may take form in different combinations of electrode materials and electrolytes, including lead-acid, nickel-cadmium, nickel-metal hydride, lithium-ion, etc. Lithium-ion is often the chemistry of choice for rechargeable batteries because of its high capacity-to-size ratio and low self-discharge characteristics. While rechargeable batteries come in many different configurations as noted above, the present invention will be described with reference to a rechargeable battery of five lithium-ion cells connected in series, except where noted, it being understood the present disclosure should not be limited thereto.

SUMMARY OF THE INVENTION

A battery pack and battery charger is disclosed. In one embodiment, the battery charger includes an output terminal that provides a charging voltage Vout and charging current Iout. A battery is contained in the battery pack that has an input terminal, which can be releasably connected to the output terminal for receiving the charging voltage Vout and charging current Iout. The battery charger may include a first circuit for controlling charging voltage Vout. The battery pack may include a second circuit that generates a control signal when the output terminal is connected to the input terminal. The first circuit is configured to control Vout based on the control signal.

BRIEF DESCRIPTION OF THE DRAWINGS

In order that the advantages of the invention will be readily understood, a more particular description of the invention briefly summarized above will be rendered by reference to specific embodiments that are illustrated in the appended figures. Understanding that these figures depict only some embodiments of the invention and are not therefore to be considered to be limiting of its scope, the invention will be described and explained with additional specificity and detail through the use of the accompanying figures.

The use of the same reference symbols m different drawings indicates similar or identical items.

DETAILED DESCRIPTION

Figure 1:
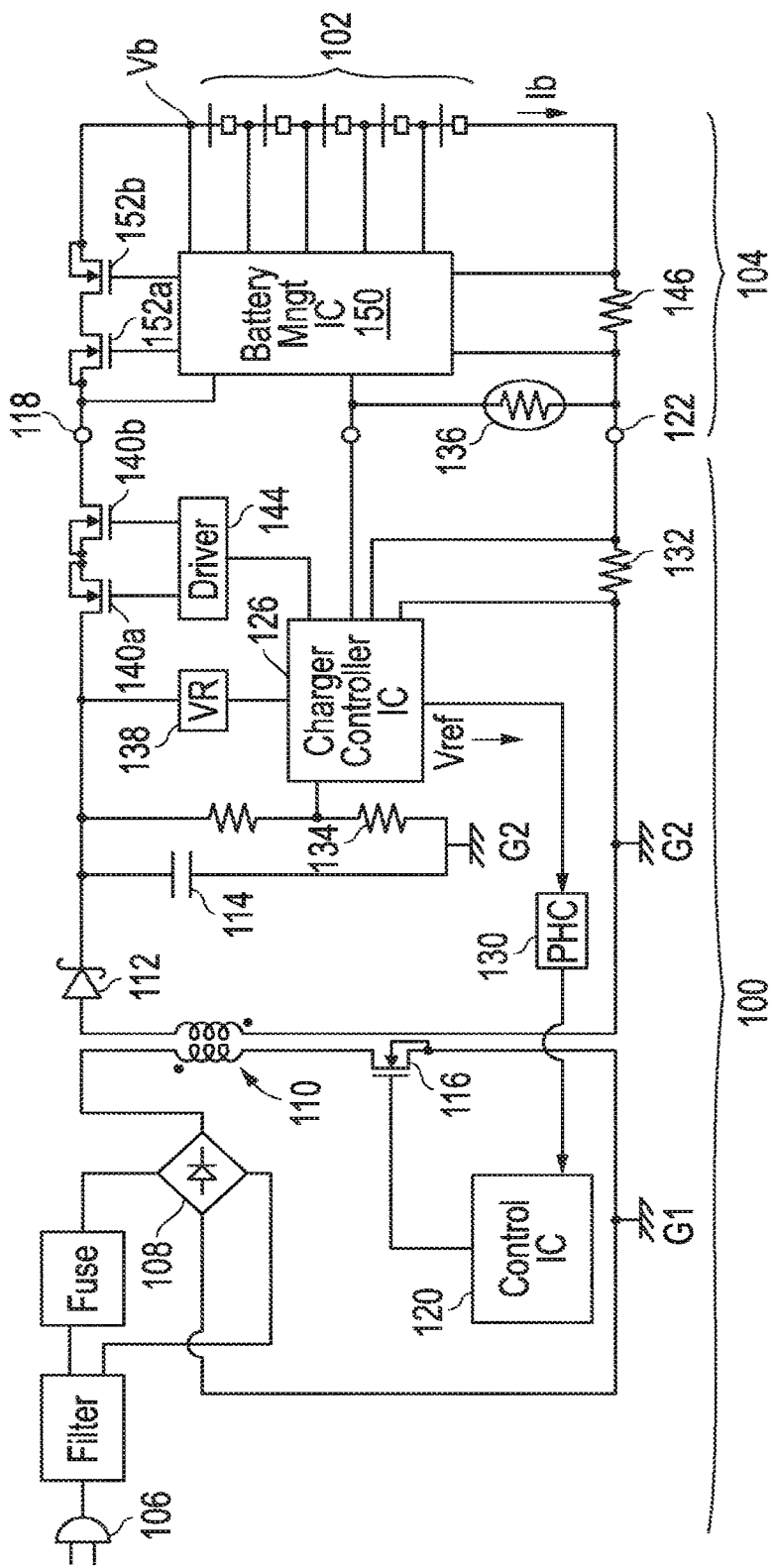
FIG. 1 is a diagram illustrating a schematic diagram of a battery pack and a battery pack charger.

It will be readily understood that components of the invention, as generally described and illustrated in the figures herein, may be arranged and designed in a wide variety of different configurations. Thus, the following detailed description of the embodiments of the apparatus, system, and method of the invention, as represented in the attached figures, is not intended to limit the scope of the invention, as claimed, but is merely representative of selected embodiments of the invention.

The features, structures, or characteristics of the invention described throughout this specification may be combined in any suitable manner in one or more embodiments. For example, reference throughout this specification to "an embodiment," "some embodiments," or similar language means that a particular feature, structure, or characteristic described in connection with the embodiment is included in at least one embodiment of the invention. Thus, appearances of the phrases "in one embodiment," "in other embodiments," or similar language throughout this specification do not necessarily all refer to the same group of embodiments, and the described features, structures, or characteristics may be combined in any suitable manner in one or more embodiments.

A battery charger is a device that puts energy into a rechargeable battery by forcing an electric current through it. There are several types of battery chargers. A simple, constant voltage charger provides a constant direct current (DC) voltage for charging the battery. Constant voltage chargers are often used to charge lead-acid cells used in car batteries. In contrast, current chargers vary the voltage they apply to a battery in order to maintain a constant current flow. Ideally, constant current chargers should switch off the charging current when the voltage on the battery reaches full charge. Constant current charging is typically used for nickel-cadmium and nickel-metal hydride cells.

Constant voltage chargers can be safely used to charge lithium-ion batteries if the charging current is limited. While safe, this type of charging process is slow. A more optimal process for charging a lithium-ion cell involves three distinct and consecutive phases: a pre-charge phase (if needed), a constant current phase, and a constant voltage phase. Importantly, the three phase process ensures battery safety and promotes a longer life without compromising performance.

During the first or pre-charge phase, a lithium-ion cell is charged with a constant, low DC current (e.g., 10% of the full-charge current). This prevents the cell from overheating until such a time that it is able to accept the full current of the next, constant-current phase. In reality, the pre-charge phase may not be needed since most lithium-ion battery packs are designed with a battery management IC that shuts down the battery while there's still some charge left because deep discharge, like overcharging, can damage lithium-ion cells. However if the pre-charge phase is used, it usually continues until the voltage across the cell reaches a first voltage threshold, at which point the pre-charge phase stops, and the constant-current phase starts. During the constant-current phase the lithium-ion battery cell is charged with a constant, high DC current until the cell voltage reaches a second voltage threshold. This second voltage threshold is usually the cell's limit. Lithium-ion with the traditional cathode materials of cobalt, nickel, manganese and aluminum typically charge to a limit of 4.20V/cell. Some nickel-based varieties charge to 4.10V/cell. Some high capacity lithium-ion cells may charge to 4.30V/cell and higher. After the second voltage threshold is reached, the constant-current phase ends, and the constant-voltage phase begins. While the cell is charging during this last phase, the charging current should continuously fall. When the charging current falls below a threshold, the charging process should stop. This three-phase process could be used to charge a battery consisting of N lithium-ion cells that are connected in series, but the pre-charge phase should end when Vb, the voltage across the battery, equals N times the first voltage threshold, and the constant-current phase should end when Vb equals N times the second voltage threshold.

The time needed to charge a lithium-ion cell using this three-phase process should be shorter than the time needed to charge the same lithium-ion cell using a constant voltage, limited current process. For this reason the three-phase process is preferred over the constant voltage, limited current process. However, the three-phase process requires a more complicated and possibly more expensive electronic control system to implement.

FIG. 1 illustrates relevant components of a battery charger 100 that is configured for charging a rechargeable lithium-ion battery (RLIB) 102 of battery pack 104. RLIP 102 contains five lithium-ion cells coupled in series. It should be noted that while charger 100 is configured for charging RLIB 102, charger 100 may not be suitable for charging a battery that contains a different number of lithium-ion battery cells, lithium-ion cells connected in parallel, or cells that are made from a chemical composition other than lithium-ion. In other words, charger 100 is substantially limited in its applicability.

Battery charger 100 includes terminal 106, which is configured to receive an AC voltage input from an external supply. A diode bridge rectifier 108 is coupled to input terminal 106 via a filter and fuse. A diode bridge rectifier is an arrangement of four or more diodes in a bridge circuit. Diode bridge rectifier 108 rectifies the AC input into a continuous, but poorly regulated intermediate DC output.

Battery charger 100 includes a flyback DC-DC converter, which is a circuit that converts a source DC from one voltage level to another. The flyback DC-DC converter of FIG. 1 includes: an isolation transformer 110, which has primary and secondary windings that are coupled directly or indirectly to grounds G1 and G2, respectively, of different potentials; a diode 112, and; a capacitor 114. "Isolation" describes the electrical separation between the input and output of the transformer, which reduces the possibility that a user could be electrically shocked due to the difference in potentials between the grounds G1 and G2.

Charger 100 includes a power transistor (e.g. MOSFET) 116 that is directly controlled by control IC 120. In one embodiment, control IC 120 generates a pulse width modulated (PWM) signal that is applied to the gate of MOSFET 116. Current flows through MOSFET 116 and energy is stored in transformer 110 with each pulse of the PWM signal. In essence the flyback converter indirectly provides a charging voltage Vout, which depends on the duty cycle of the PWM signal. More particularly, $VoutNdc=D/n(1-D)$, where Vdc is the output of rectifier 108, D is duty cycle of the PWM signal, and $n=Np/Ns$ (i.e., the ratio of the primary and secondary windings of transformer 110). The magnitude of Vout can be adjusted by changing duty cycle D. As the duty cycle increases, so does the magnitude of Vout, and vice versa. As will be more fully described below, charger 100 includes a charger controller IC 126 that can indirectly control Vout.

Charger 100 includes output terminal 118 and a return terminal 122. Output terminal and return terminal may be referred to herein as a pair of output terminals. Terminals 118 and 122 are releasably coupled to respective terminals (not shown) of battery pack 104. Charger 100 provides charging current Iout, part of which is used for charging RLIB 102.

Charger controller IC 126 indirectly controls Vout using feedback. Charger controller IC 126 receives as inputs the voltages across resistors 132 and 134, which substantially represent Iout and Vout, respectively. It should be noted that the voltage across resistor 134 is not identical to Vout because of voltage drops across, for example, resistor 135, and switches 140. Charger controller IC 126 receives as input the voltage across thermistor 136, which represents temperature Temp of RLIB 102. Importantly, charger controller 126 does not receive an input signal from battery pack 104 other than temperature Temp. In other words, charger controller IC 126 does not receive signals that represent Vb, the voltage across RLIB 102, voltages across the individual lithium-ion cells, or current flow through individual cells. If charger controller IC 126 did receive these signals, charger controller IC 126 could implement an optimized, three-phase charging process like the one described above.

Charger controller IC 126 generates control signal Vref in response to implementing a process for charging RLIB 102. Vref controls Vout at terminal 118. For purposes of explanation, charger controller IC 126, which is powered by voltage regulator 138, generates control signal Vref in response to implementing a constant, low voltage and limited current charging process. Charger controller IC 126 could've been configured differently. For example, if charger controller IC 126 received signals (i.e., signals that represent Vb, voltages across cells, and/or Ib, the current flow through individual cells) from pack 104, then charger controller IC 126 could've been configured to generate Vref in accordance with the optimized three-phase charging process described above. This could lead to a more efficient process for fully charging RLIB 102. Unfortunately, the overall cost and complexity of the system in FIG. 1 would increase if charger 100 and pack 104 were redesigned to facilitate a transmission of Vb, voltages across cells, and/or Ib to and use by charger controller IC 126. Charger controller IC 126 could've been configured to implement a three-phase process for charging RLIB 102 based on V134, the voltage across resistor 134, and V132, the voltage across resistor 132, which substantially represents Iout. But this three-process would be less optimized when compared to a three-phase charging process based on Vb and Ib, since V134 is not identical to Vb, and Iout is not identical to Ib. In other words, implementing a three-phase charging process based on V134 and V132 may not be as efficient as implementing a three-phase charging process based on Vb and Ib. In addition, RLIB 102 may not be as fully charged using the three-phase process based on V134 and V132. For purposes of explanation, as noted, charger controller IC 126 will be described with reference to charging RLIB 102 using a constant voltage, limited current process.

Vref is generated as a function of V134 and V132, which are substantially similar to Vout and Iout. Vref is transmitted to control IC 120 via photocoupler (PHC) 130. Like transformer 110, PHC 130 provides electrical isolation between ground G1 and ground G2. Control IC 120 generates the PWM signal input to MOSFET 116 based on Vref. In one embodiment, the duty cycle D of the PWM signal increases when the magnitude of Vref increases, and vice versa. Vout depends on duty cycle D as noted above. Thus, the magnitude of Vout increases when Vref increases, and vice versa.

Charger controller IC 126 maintains Vout at a constant, low voltage while RLIB 102 is being charged. Charger monitors Iout and Temp via resistor 132 and thermistor 136, respectively. If Iout exceeds a predetermined limit, charger controller 126 can lower Vout by adjusting Vref accordingly, or charger controller can deactivate one or both of switches 140 via driver circuit 144. Charger controller IC 126 can also terminate the charging process when Iout drops below a predetermined minimum value.

Battery pack 104 includes a battery management IC 150 and switches 152 coupled to RLIB 102 as shown. Battery management IC 150 monitors cells of RLIB 102 collectively and individually for safe operation. Lithium-ion batteries in general and RLIB 102 in particular, may suffer thermal runaway and cell rupture if overheated. In extreme cases this can lead to combustion. Lithium-ion cells should not be over charged or over discharged. Lithium-ion cells are also susceptible to damage if their voltage falls outside a safe range.

Battery management IC 150 may include an analog front end (AFE) formed on a semiconductor die, which is in data communication with a microcontroller unit (MCU) or an application specific integrated circuit (ASIC) that is formed on another semiconductor die. For purposes of explanation only, it will be presumed that battery management IC includes an MCU. The AFE may include analog signal conditioning circuitry (e.g., analog amplifiers, filters, etc.) needed by the MCU to monitor RLIB 102. The MCU implements a battery monitoring process based on signals provided by the AFE.

Battery management IC 150 in general, and the MCU in particular thereof, can monitor the temperature Temp of RLIB 102 using the voltage across thermistor 136. If Temp exceeds a threshold value, battery management IC 150 deactivates one or both switches 152. Battery management IC 150 can also monitor Vb across RLIB 102 and the voltages individual cells thereof. If one or these voltages exceeds its respective upper threshold or drops below its respective lower threshold, battery management IC 150 deactivates one or both switches 152. Battery monitoring should not be limited to the foregoing functions. Additional battery monitoring functions are contemplated. While battery management IC 150 can monitor RLIB 102 for safe operation, battery management IC 150 cannot control the charging voltage Vout or charging current Iout provided by charger 100.

As noted above, charger controller IC 126 implements a constant, low voltage, and limited current process for charging RLIB 102 to avoid unduly degrading or damaging RLIB 104, or to avoid a hazardous situation. The constant, low voltage charging process is less than optimal for several reasons. For example the time needed to charge RLIB 102 will be substantially longer than it could using the three-phase charging process described above. Moreover, charger controller 126 terminates the charging process when Iout drops below a minimum value, even though the cells of RLIB 102 are less than fully charged. As a result, it's possible that charger 100 may not charge RLIB 102 to its full potential.

Figure 2:
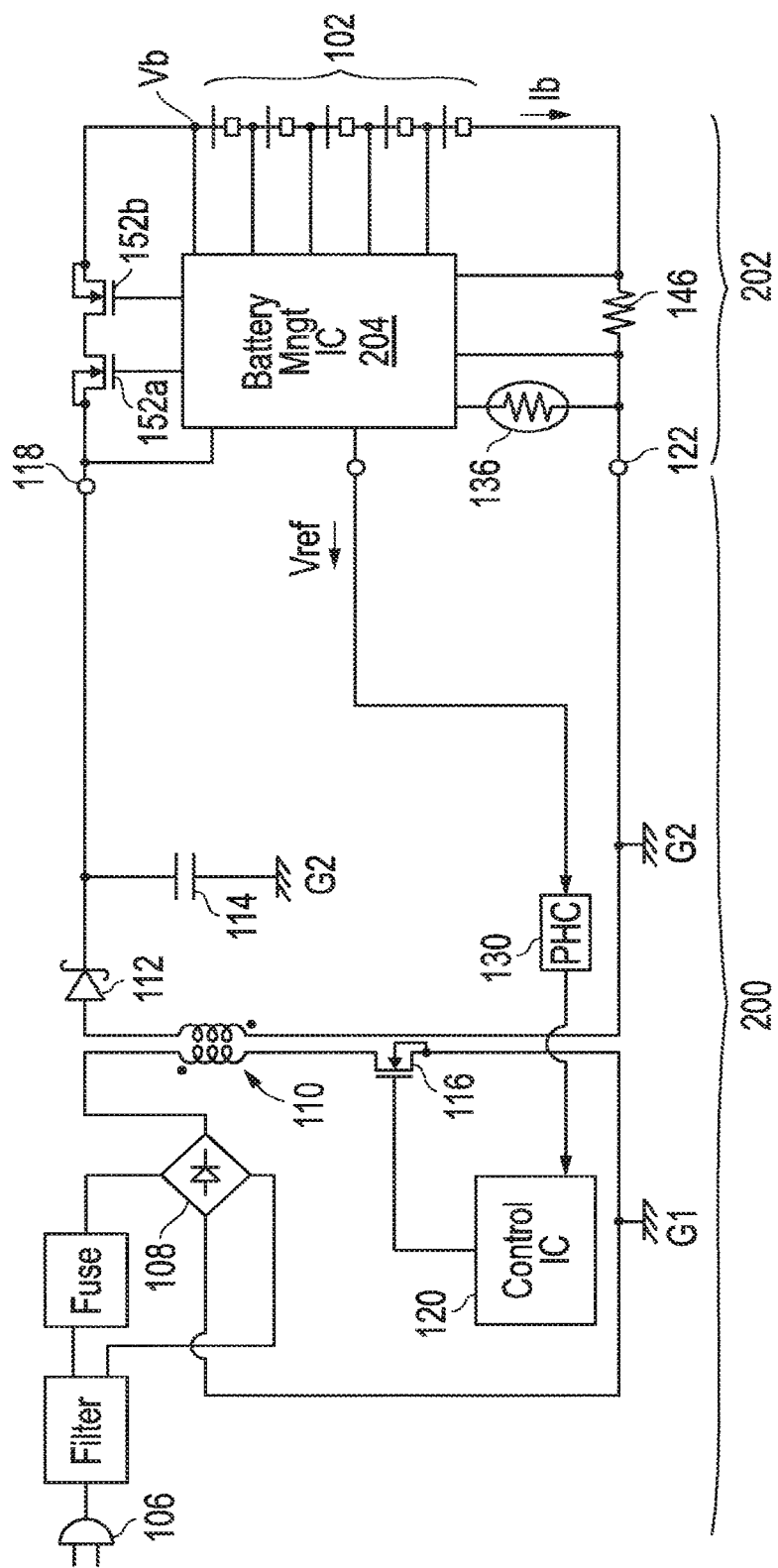
FIG. 2 is a diagram illustrating components of a battery pack and a battery pack charger according to one embodiment of the present invention.

Charger controller IC 126, VR 138, switches 140, driver 144, etc., are components that increase the cost and complexity of manufacturing battery charger 100. Further, as noted above, charger 100 is less than optimized for charging RLIB 102. FIG. 2 illustrates relevant components of an alternative design that addresses these problems and others. In particular, FIG. 2 shows a battery charger 200 coupled to battery pack 202. Charger 200 includes several components of charger 100, including input terminal 106, rectifier 108, transformer 110, MOSFET 116, control circuit IC 120, and photocoupler 130. A fuse or other device, could be placed in series between diode 112 and output terminal 118 for extra safety. Charger 200, however, lacks many components of charger 100. For example, charger 200 lacks charger controller IC 126, resistors 132 and 134, etc. Charger 200 is simple and less expensive to make when compared to charger 100. As will be more fully described below, charger 200 can charge any one of many battery packs that have different configurations. State differently, charger 200 is a "one size fits all" charger.

Battery pack 202 contains several components of battery pack 104 shown in FIG. 1, including, thermistor 136, shunt resistor 146, switches 152, and RLIB 102. Battery pack 202 also includes a battery management IC 204. Like battery management IC 150 of FIG. 1, battery management IC 204 monitors RLIB 102 for safe operation; if battery management IC 204 determines that RLIB 102 is operating outside safe operating ranges, battery management IC 150 deactivates one or both of switches 152.

While battery management IC 150 and battery management IC 204 are equal in their ability to monitor RLIB 102 for safe operation, battery management IC 204 provides additional functions. For example, battery management IC 204 can control charger 200 in general and its charging voltage Vout in particular. In one embodiment, battery management IC 204 can implement the optimized, three-phase process described above for charging RLIB 102 as will be more fully described below. Further, battery management IC 204 can include a memory in which battery management IC 204 maintains historical data for RLIB 102. This data may include, for example, the number of times RLIB 102 has been charged, the temperatures at which RLIB 102 has been charged, the cumulative charging time for RLIB 102, etc., and other parameters that may affect the performance of battery RLIB 102. The historical data can be subsequently processed by battery management IC 204 to adjust the three-phase charging process it implements for RLIB 102 as it ages.

In one embodiment, battery management IC 204 is formed on a single semiconductor die, which includes an MCU and an AFE interface to RLIB 102. The MCU includes a central processing unit (CPU) and a program memory (e.g., flash memory) that stores instructions, which are executable by the CPU for (1) monitoring RLIB 102 for safe operation, (2) updating stored historical data for RLIB 102, and (3) controlling charger 200 as RLIB 102 is charged. With respect to the last function, the instructions for controlling charger 200 are unique to RLIB 102. MCUs can be programmed with different sets of CPU executable instructions that, when executed, implement distinct charging processes that are optimized for other battery packs (not shown in FIG. 2) that contain a different number or arrangement of lithium-ion battery cells, or battery cells that are made from a chemical composition other than lithium-ion.

Battery management IC 204 receives inputs. For example, battery management IC 204 receives analog inputs that represent Vb across RLIB 102, voltages across individual cells of RLIB 102, the voltage across shunt resistor 146, and the voltage across thermistor 136. The voltage across shunt resistor 146 substantially equals current Ib flowing through RLIB 102. Other inputs to battery management IC 204 are contemplated. The AFE may include analog circuitry for conditioning the analog inputs. For example, the AFE may include one or more analog-to-digital convertors (ADCs) for converting the foregoing analog signals into digital equivalents. Battery management IC 204 generates control signal Vref in response to processing one or more of these digital equivalents in accordance with instructions stored in flash memory. The MCU of battery management IC 204 may also include a digital-to-analog convertor (DAC) for converting the control signal Vref it generates into an analog equivalent before it is subsequently transmitted to and received by control IC 120 of charger 200 via photocoupler 130. Control IC 120 receives Vref and generates a PWM signal input to MOSFET 116 based on Vref. In one embodiment, the duty cycle D of the PWM signal increases when the magnitude of Vref increases, and vice versa. Vout depends on duty cycle D as noted above. Thus, the magnitude of Vout increases when Vref increases, and vice versa. Accordingly, battery management IC 204 indirectly controls Vout via Vref.

Figure 3:
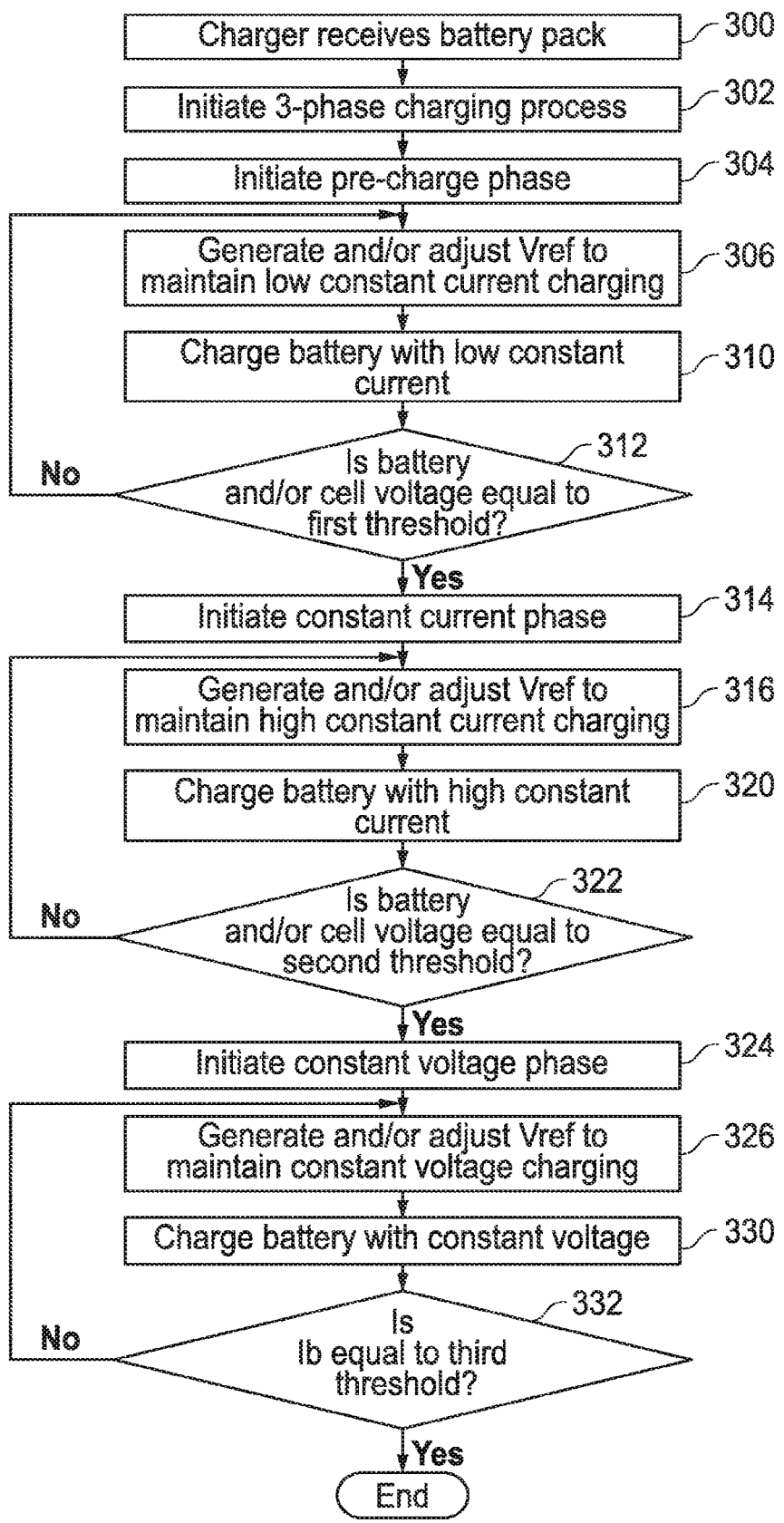
FIG. 3 is a flow chart illustrating an example method for charging the battery pack shown in FIG. 2.

For purposes of explanation, battery management IC 204 controls charger 200 by adjusting Vref in accordance with a three-phase charging process described below, it being understood the present invention should not be limited thereto. Battery management IC 204 can also adjust Vref based on a stored history of RLIB 102. During each phase of the charging process, battery management IC 204 generates/adjusts and transmits Vref to control IC 120 via photocoupler 130. Vout is produced at terminal 118 in response to control IC 120 receiving Vref, and the magnitude of Vout is proportional to the magnitude of Vref. FIG. 3 is a flow chart illustrating relevant aspects of an example process implemented by battery management IC 204 for controlling charger 200.

With continuing reference to FIGS. 2 and 3, during the first or pre-charge phase (if needed), battery management IC 204 generates/adjusts Vref in step 306 so that RLIB 102 is charged with a constant, low level DC current Ib (e.g., 10% of the full-charge current) that is suitable for the configuration and composition of RLIB 102. Battery management IC 204 can calculate a digital value for low level Ib. In one embodiment, battery management IC 204 may calculate the value for low level Ib based on the history of RLIB 102 that is stored in memory. In other words battery management IC 204 may calculate a value for low level Ib at the beginning of the pre-charge phase that is based on, for example, the number of times that RLIB 102 has been recharged, the date when RLIB 102 was manufactured, etc. Battery management IC 204 can then calculate a digital value for Vref that corresponds to the value it calculates for low level Ib. Alternatively, battery management IC 204 may access a table in memory that maps the calculated low level Ib to Vref. Battery management IC 204 converts the digital value of Vref into an analog equivalent before it is transmitted to IC control 120.

Battery management IC 204 can measure the charging current Ib during the pre-charge phase using the voltage across resistor 146. Battery management IC 204 can compare a digital equivalent of the measured charging current Ib to the low level value it calculated. If the measured and calculated values do not match, battery management IC 204 can adjust Vref until they do match. In this manner battery management IC 204 can adjust Vref to keep Ib at the constant low level it calculated for the pre-charge phase. Battery management IC 204 can also compare the voltage Vb across RLIB 102 and/or the voltages across individual cells thereof, with first predetermined threshold values stored in memory during the pre-charge phase. In one embodiment this comparison can occur while switches 152 are deactivated. Before the pre-charge phase of the charging process begins, battery management IC 204 may calculate or adjust one or more of the first voltage thresholds based on a charging or discharging history of RLIB 102 that is stored in memory. When voltage Vb across RLIB 102 reaches a first voltage threshold, or when a voltage across one of the cells reaches its first voltage threshold as shown in step 312, battery management IC 204 can stop the pre-charge phase, and start the second or constant-current phase as shown in step 314.

During the constant-current phase battery management IC 204 generates/adjusts Vref so that RLIB 102 is charged with a constant, high DC current Ib that is suitable for the configuration and composition of RLIB 102. Battery management IC 204 may calculate a value for the high charging current Ib based on the history of RLIB 102 that is stored in memory. Battery management IC 204 can then calculate or map a value for Vref that corresponds to the high Ib value before the constant current phase begins. Battery management IC 204 can measure the actual charging current Ib using the voltage across shunt resistor 146 during the constant-current stage. Battery management IC 204 can compare a digital equivalent of the actual charging current Ib with the calculated high value for Ib. Battery management IC 204 can adjust Vref to keep Ib at the calculated constant level. Battery management IC 204 also compares the voltage Vb across RLIB 102 and/or the voltages across individual cells thereof, with second threshold values during the constant-current phase. In one embodiment this comparison is made while switches 152 are deactivated. Before the constant-current phase begins, battery management IC 204 may calculate or adjust one or more of the second voltage thresholds based on the history of RLIB 102 that is stored in memory. When voltage Vb as measured across RLIB 102 reaches a second voltage threshold, or when a voltage as measured across one of the cells reaches its second voltage threshold as shown in step 322, battery management IC 204 stops the constant current phase, and starts the third or constant-voltage phase.

During the constant-voltage phase battery management IC 204 generates/adjusts Vref to maintain Vb at a constant voltage that is suitable for the configuration and composition of RLIB 102. Battery management IC 204 can calculate a suitable value for Vb before the constant voltage phase based on the history of RLIB 102 stored in memory. This value can be mapped to a corresponding value Vref, which is subsequently provided to control IC 120. While RLIB 102 is charged during the last phase, battery management IC 204 monitors current Ib via shunt resistor 146 and Vb. Battery management IC 204 compares Vb to the value it calculated for Vb and adjust Vref accordingly when the values do not match. Ib should continuously fall during the last charging phase. When Ib as measured across shunt resistor 146 falls below a third threshold, battery management IC 204 stops the charging process as shown in step 332, and deactivates switches 152. Battery management IC 204 can calculate the threshold based on the history of RLIB 102 before the last phase begins.

Figure 4:
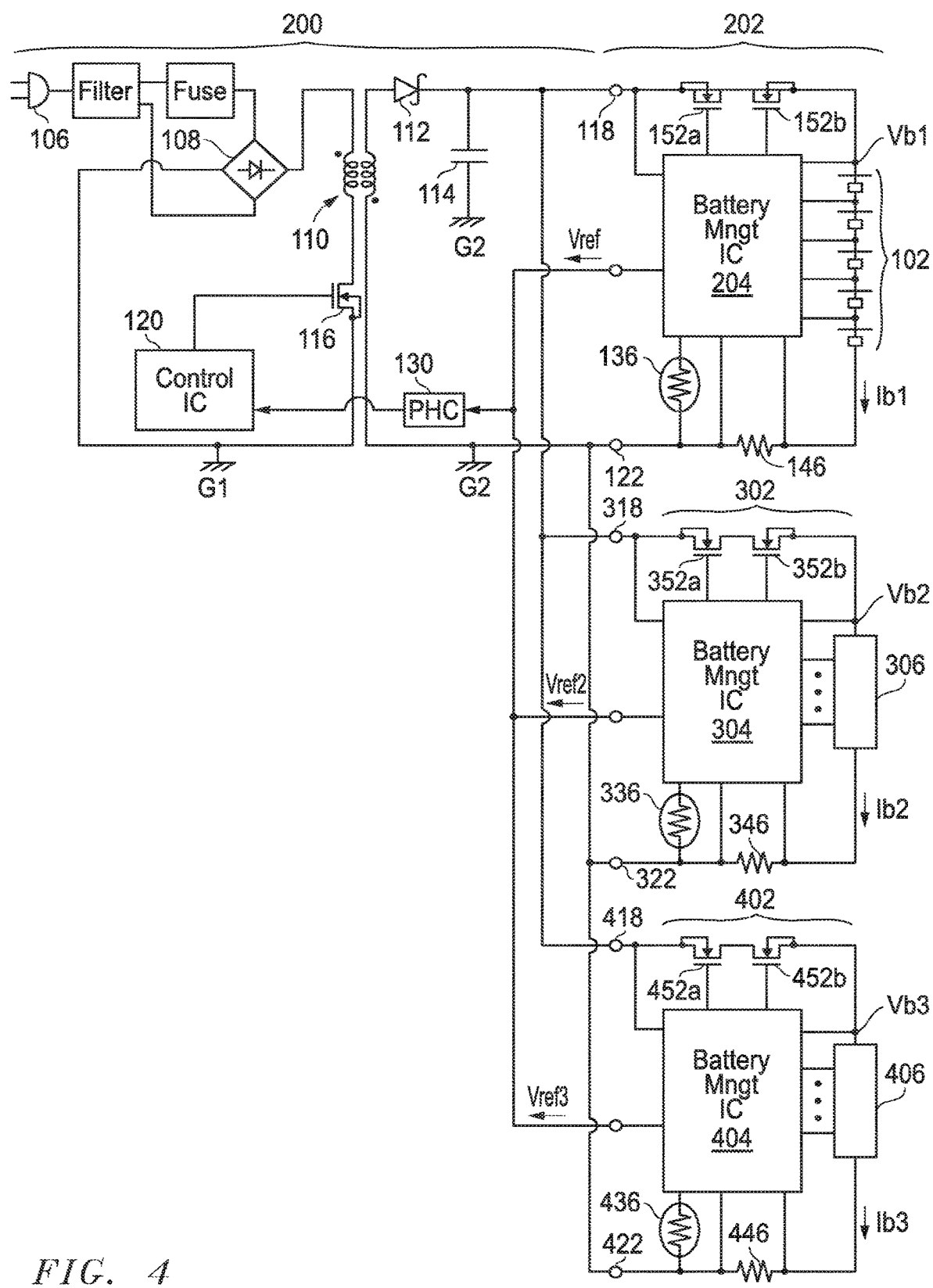
FIG. 4 is a diagram illustrating an alternative battery pack charger.

FIG. 4 illustrates an alternative embodiment in which charger 200 includes additional output terminals 318 and 418, and additional terminals 322 and 422, which are releasably connected to corresponding terminals of battery packs 302 and 402. Charger 200 of FIG. 4 can charge battery packs 202, 302, and 402 when connected as shown. Each of the battery packs 302 and 402 include a battery management IC 304 and 404, respectively, and batteries 306 and 406, respectively. Each battery 102, 306, and 406 includes one or more battery cells connected in series or parallel, each battery is configured differently. RLIB 102 includes the five lithium-ion cells connected in series as described above, but battery 306 may include four lithium-ion cells connected in series and/or in parallel, and battery 406 may include three or more cells connected in series and/or in parallel, which have a chemistry other than lithium-ion.

Each of battery management IC 304 and 404 may include an AFE and MCU formed on a single semiconductor die. The MCUs of a battery management ICs 204, 304, and 404 are presumed to be substantially similar or identical in structure. However, the flash memories of the MCUs may store distinct sets of instructions for monitoring and charging RLIBs 102, 306, and 406, respectively. The charging process implemented by battery management IC 204 is described above. Battery management IC 304 implements a different charging process that is suitable for the configuration of battery 306, while battery management IC 404 implements another charging process that is suitable for the configuration of battery 406. The functions of AFEs in battery management ICs 204, 304, and 404 are substantially similar, but are presumed to be structurally different to accommodate the distinct configurations of batteries 102, 306, and 406, respectively. In another embodiment, battery management ICs 304 and 404 may be identical to battery management IC 204, and batteries 306 and 406 may be identical to RLIB 102.

Battery management ICs 204, 304, and 404 can generate Vref, Vref2, and Vref3, respectively for controlling charger 200. However, only one of batteries 102, 306, and 406 can be charged at a time. Thus, only one of the battery management ICs 204, 304, and 404 control charger 200 at a time, and as a result only one of Vref, Vref2, and Vref3 is asserted at a time. Battery management ICs 204, 304, and 404 monitor the voltage on the common line connected to PHC 130. If one of the battery management ICs 204, 304, and 404 detects a voltage other than a constant predetermined voltage on the common line, the battery management IC concludes that another one of the battery management ICs 204, 304, and 404 is controlling charger 200. Only one of battery management ICs 204, 304, and 404 will assert its control signal Vref, Vref2, and Vref3 and activate its switches 152, 352, and 452, respectively, only when the one battery management IC detects the common line to PHC 130 is floating or at the predetermined voltage (e.g., 0 volts with high impedance).

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
a circuit in a battery pack generating a control signal Vref;
the circuit transmitting the control signal to a battery charger coupled to the battery pack;
the battery charger generating an output voltage Vout for use in charging a battery of the battery pack, wherein the output voltage Vout varies with the control signal Vref.

2. The method of claim 1 further comprising:
the circuit receiving a signal representing a voltage across the battery or a cell thereof;
the circuit converting the signal into a digital equivalent;
the circuit comparing the digital equivalent to a predetermined value.

3. The method of claim 2 further comprising:
the circuit receiving a second signal representing current flow through the battery;
the circuit converting the second signal into a second digital equivalent;
the circuit comparing the second digital equivalent to a second predetermined value;
the circuit adjusting the control signal Vref that is transmitted to the battery charger in response to comparing the second digital equivalent to the second predetermined value.

4. The method of claim 1 further comprising:
the circuit receiving a signal representing current flow through the battery;
the circuit converting the signal into a digital equivalent;
the circuit comparing the digital equivalent to a predetermined value;
the circuit adjusting the control signal Vref that is transmitted to the battery charger in response to comparing the digital equivalent to the predetermined value.

5. The method of claim 1 further comprising:
the circuit storing data in a memory, wherein the data represents the number of times the battery has been charged;
the circuit accessing the memory to read the data, wherein the circuit generates the control signal Vref in response to processing the data read from the memory.

6. The method of claim 1 further comprising:
transmitting the first control signal to the circuit by a voltage isolation device, wherein the battery charger further comprises the voltage isolation device.

7. The method of claim 1 further comprising:
monitoring a voltage Vb across the first battery, a total charge on the first battery, and/or a temperature associated with the first battery by the first circuit.

8. The method of claim 1 further comprising:
providing Vout concurrently at all of a plurality of pairs of output terminals, wherein the battery charger comprises the plurality of pairs of output terminals including a first pair of output terminals.

9. The method of claim 8 further comprising:
generating, by a second circuit, a second control signal when a second pair of input terminals of a second battery pack is connected to a second pair of the plurality of pairs of output terminals, wherein the plurality of battery packs includes the first battery pack.

10. The method of claim 9 further comprising:
controlling, by the circuit, Vout based on the second control signal; and
generating the first and second control signals, by only one of first and second circuits respectively.

11. The method of claim 10, wherein the generating the first and second control signals further comprises generating the first and second control signals, by only one of first and second circuits respectively, at any time when the first and second pairs of input terminals are concurrently connected to the first and second pairs of output terminals, respectively, of the battery charger.

12. The method of claim 1 further comprising:
generating, by the circuit, the control signal based on a voltage across a rechargeable battery or a cell thereof, wherein the battery pack comprises a rechargeable battery.

* * * * *